United States Patent
Chen

(10) Patent No.: US 10,537,835 B2
(45) Date of Patent: Jan. 21, 2020

(54) FULLY AUTOMATIC MAGNETIC FILTER

(71) Applicant: Universal Filtration (Shanghai) Co., Ltd., Pudong, Shanghai (CN)

(72) Inventor: Jian Guo Chen, Shanghai (CN)

(73) Assignee: UNIVERSAL FILTRATION (SHANGHAI) CO., LTD., Pudong, Shanghai (CN)

( * ) Notice: Subject to any disclaimer, the term of this patent is extended or adjusted under 35 U.S.C. 154(b) by 166 days.

(21) Appl. No.: 15/861,267

(22) Filed: Jan. 3, 2018

(65) Prior Publication Data
US 2019/0160402 A1 May 30, 2019

(30) Foreign Application Priority Data

Nov. 27, 2017 (CN) .......................... 2017 1 1204017

(51) Int. Cl.
*B01D 35/06* (2006.01)
*B03C 1/28* (2006.01)
*B03C 1/12* (2006.01)
*B03C 1/14* (2006.01)

(52) U.S. Cl.
CPC ............ *B01D 35/06* (2013.01); *B03C 1/12* (2013.01); *B03C 1/14* (2013.01); *B03C 1/286* (2013.01); *B03C 1/288* (2013.01); *B03C 2201/18* (2013.01)

(58) Field of Classification Search
CPC ........... B01D 35/06; B03C 1/12; B03C 1/286; B03C 1/288; B03C 1/14; B03C 2201/18; C02F 1/48–488
See application file for complete search history.

(56) References Cited

U.S. PATENT DOCUMENTS

| | | | | |
|---|---|---|---|---|
| 2,765,084 A * | 10/1956 | Tursky | .................... | B01D 29/33 210/323.2 |
| 3,425,557 A * | 2/1969 | Rosaen | ................ | B01D 29/014 210/108 |
| 2008/0164183 A1* | 7/2008 | Marston | .................... | B03C 1/03 209/214 |
| 2015/0298138 A1* | 10/2015 | Vareika | ..................... | B03C 1/14 210/222 |
| 2016/0121245 A1* | 5/2016 | Ekberg | ................... | B01D 33/23 210/222 |
| 2016/0184833 A1* | 6/2016 | Yen | ......................... | B03C 1/032 210/695 |

* cited by examiner

*Primary Examiner* — Liam Royce
(74) *Attorney, Agent, or Firm* — Muncy, Geissler, Olds & Lowe, P.C.

(57) ABSTRACT

A fully automatic magnetic filter includes an apparatus barrel, magnetic rollers, scrapers, and a motor. The number of the magnetic rollers is four and corresponds to the number of the scrapers. The magnetic rollers are located in the apparatus barrel, and each includes an outer layer and an inner core. The outer layer is sleeved onto the inner core. The inner core has a magnetic region and a non-magnetic region. The outer layers of the magnetic rollers are driven and connected through a gear. The outer layer of one of the magnetic rollers is connected with the motor and driven by the motor. Each scraper corresponds to the outer layer of a corresponding one of the magnetic rollers. When the iron filings adsorbed on the outer layer are rotated to the non-magnetic region, the iron filings can be scraped off by the scrapers.

9 Claims, 3 Drawing Sheets

FULLY AUTOMATIC MAGNETIC FILTER

FIELD OF THE INVENTION

The present invention relates to a fully automatic magnetic filter.

BACKGROUND OF THE INVENTION

A conventional magnetic filter is used to filter magnetic impurities in the medium. The magnetic impurities include iron filings. Specifically, the magnetic filter mainly includes a magnetic bar having magnetism. When in use, the magnetic bar is able to adsorb magnetic impurities in the medium, thereby effectively reducing the magnetic impurities in the medium to achieve the purpose of purifying the medium and alleviating the adverse effects caused by the magnetic impurities in the medium on the production quality and production efficiency of the products.

However, since the magnetic bar as a whole has magnetism, it needs to power off the filter when the user wants to clean the magnetic impurities adsorbed on the magnetic bar. Therefore, the working efficiency of the magnetic filter is reduced.

SUMMARY OF THE INVENTION

In view of the shortcomings of the prior art, the primary object of the present invention is to provide a fully automatic magnetic filter that needn't power off for clearing iron filings.

In order to achieve the aforesaid object, the fully automatic magnetic filter of the present invention comprises an cylindrical housing, at least one magnetic roller, at least one scraper, and a motor. The magnetic roller is located in the cylindrical housing. The magnetic roller comprises an outer layer and an inner core. The outer layer is sleeved onto the inner core. Wherein, the inner core has a magnetic region and a non-magnetic region. The scraper is located in the cylindrical housing. The scraper cooperates with the outer layer of the magnetic roller and corresponds to the non-magnetic region. The motor is used to drive the outer layer of the magnetic roller to rotate. Wherein, the number of the at least one magnetic roller is four and corresponds to the number of the at least one scraper. Each scraper corresponds to the outer layer of a corresponding one of the magnetic rollers. The outer layers of the magnetic rollers are driven and connected through a gear. The motor is connected with the outer layer of one of the magnetic rollers.

Preferably, the non-magnetic region extends from one end to another end of the inner core in a longitudinal direction. The non-magnetic region is in the form of a sector.

Preferably, the fully automatic magnetic filter further comprises a first covering plate, a first fixing plate, a second covering plate, and a second fixing plate. The first fixing plate and the second covering plate are connected to two ends of the cylindrical housing, respectively. The inner core extends to an outside of the second covering plate and is connected to the second fixing plate. The second fixing plate is mounted on the second covering plate. One end of the outer layer is connected to the first fixing plate. Another end of the outer layer extends into the outside of the second covering plate and is connected to the gear. The gear is located between the second covering plate and the second fixing plate. The first covering plate is connected with the first fixing plate. The motor is mounted to the first covering plate. An output shaft of the motor is connected to the outer layer of the corresponding magnetic roller.

Preferably, the fully automatic magnetic filter further comprises a bearing and a bearing seat. The bearing and the bearing seat are located at the outside of the second covering plate. The bearing is fitted onto the outer layer and located between the second covering plate and the gear. The bearing seat is fitted onto the bearing and mounted on the second covering plate.

Preferably, the fully automatic magnetic filter further comprises a casing. The casing is mounted on the second covering plate. The casing and the cylindrical housing are located at two ends of the second covering plate, respectively. The gear, the second fixing plate, the bearing and the bearing seat are located in the casing.

Preferably, an outer wall of the cylindrical housing is provided with a liquid inlet and a liquid outlet. The second covering plate has a drain outlet and a sewage outlet. The drain outlet is connected with one end of a first drain tube. An opposing end of the first drain tube extends to an outside of the casing. The sewage outlet is connected with one end of a second drain tube. An opposing end of the second drain tube extends to the outside of the casing.

Preferably, the second drain tube is provided with a drain valve.

Preferably, the first fixing plate is made of polytetrafluoroethylene.

Preferably, the fully automatic magnetic filter further comprises a lifting cylinder. The lifting cylinder is installed on the outer wall of the cylindrical housing. An output shaft of the lifting cylinder is connected to the first covering plate.

According to the above technical features, the present invention has the following advantages:

The fully automatic magnetic filter according to the present invention can adsorb the iron filings in the liquid and can also clean the iron filings adsorbed on the magnetic rollers. There is no need to power off the magnetic filter for cleaning, thereby improving the work efficiency effectively.

DETAILED DESCRIPTION OF THE PREFERRED EMBODIMENTS

Embodiments of the present invention will now be described, by way of example only, with reference to the accompanying drawings.

Figure 1:
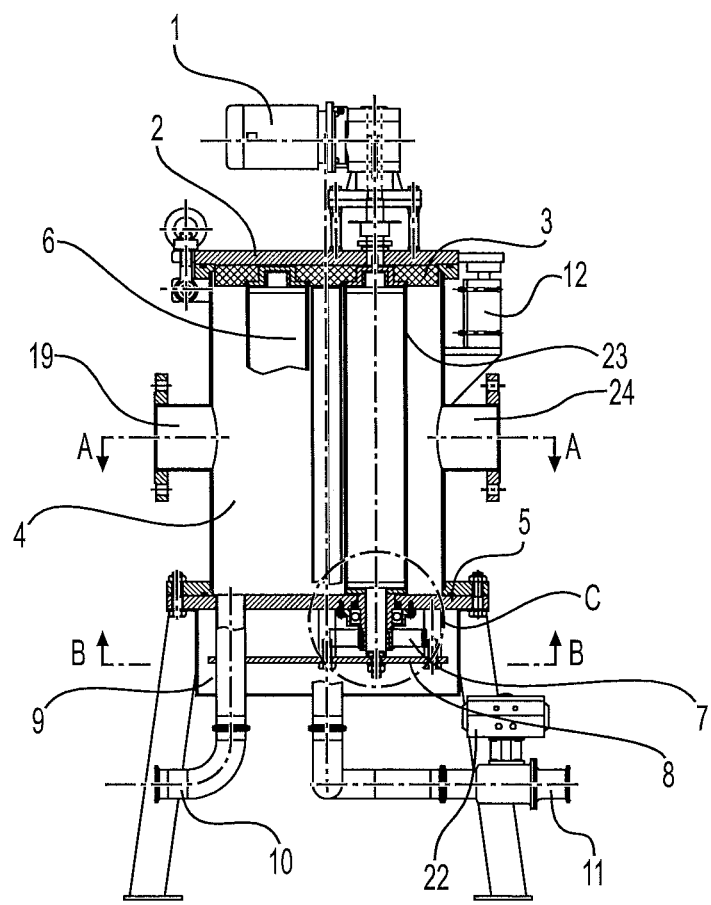
FIG. 1 is a schematic view of the fully automatic magnetic filter of the present invention.
Figure 2:
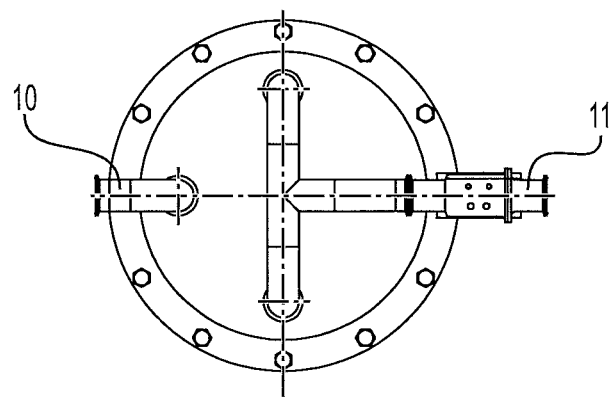
FIG. 2 is a bottom view of the fully automatic magnetic filter of the present invention.
Figure 3:
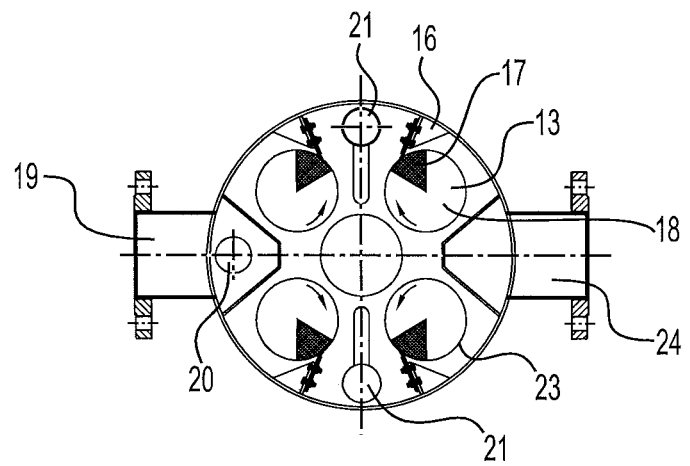
FIG. 3 is a sectional view taken along line A-A of FIG. 1.
Figure 4:
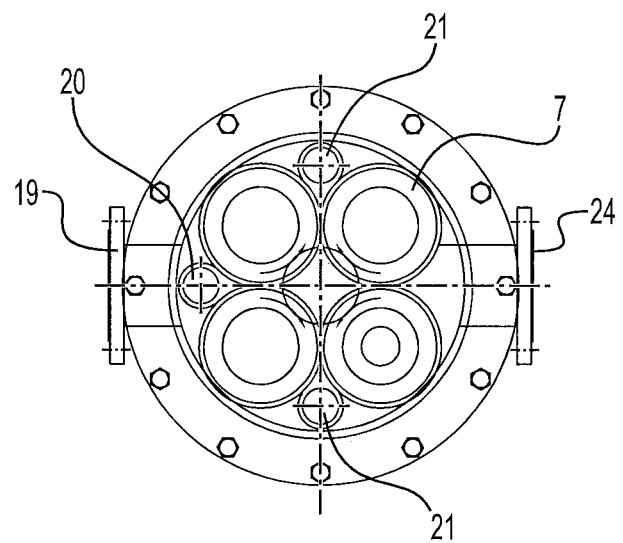
FIG. 4 is a sectional view taken along line B-B of FIG. 1.
Figure 5:
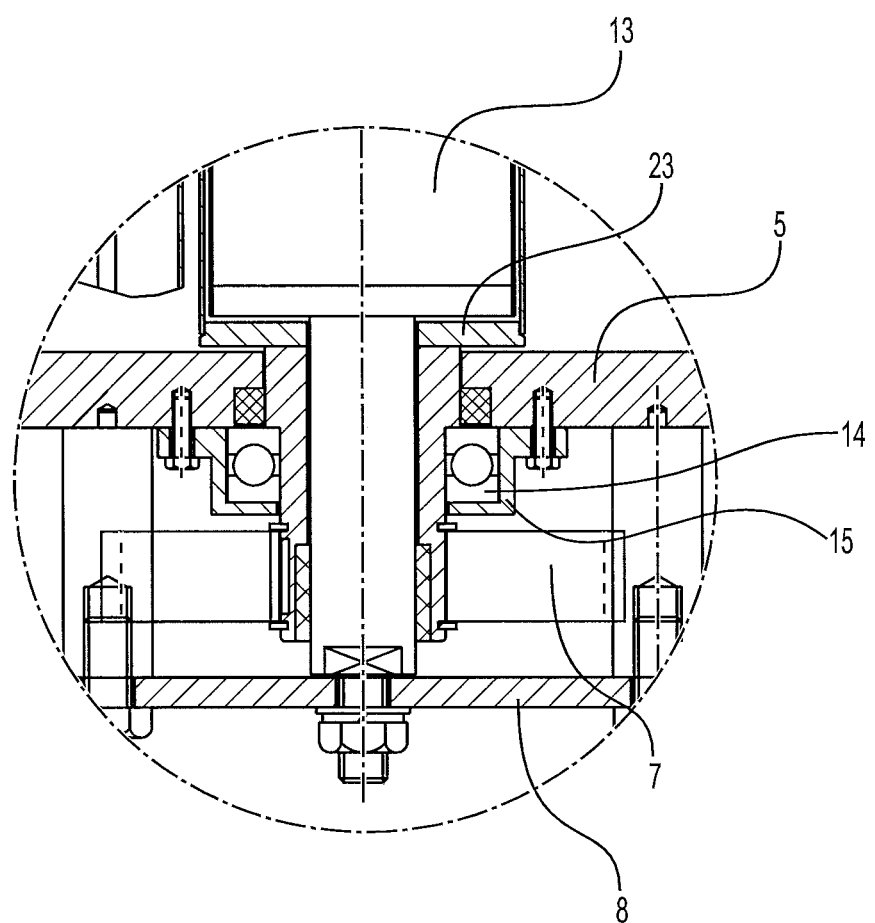
FIG. 5 is an enlarged view of circle C of FIG. 1.

As shown in FIG. 1 to FIG. 5, the fully automatic magnetic filter comprises a motor 1, a first covering plate 2, a first fixing plate 3, an cylindrical housing 4, a second covering plate 5, a magnetic roller 6, a gear 7, a second fixing plate 8, a casing 9, a lifting cylinder 12, a bearing 14, and a bearing seat 15. The upper end of the cylindrical housing 4 is connected to the first fixing plate 3. The first fixing plate 3 may be made of polytetrafluoroethylene. The lower end of the cylindrical housing 4 is connected to the second covering plate 5. The lower end of the second covering plate 5 is connected to the casing 9. Four magnetic rollers 6 are provided in the cylindrical housing 4. Each magnetic roller 6 comprises an outer layer 23 and an inner core 13. The outer layer 23 is sleeved onto the inner core 13. The outer layer 23 and the inner core 13 are rotatable with each other. Wherein, the inner core 13 extends to the inside of the casing 9 and is connected to the second fixing plate 8. The second fixing plate 8 is mounted on the second covering plate 5. One end of the outer layer 23 is connected to the first fixing plate 3. Another end of the outer layer 23 extends into the casing 9 and is connected to the bearing 14. The bearing 14 is located between the second covering plate 5 and the second fixing plate 8. The bearing 14 is sleeved with the bearing seat 15. The bearing seat 15 is mounted on the second covering plate 5. The outer layer 23 is fitted with the gear 7. The gear 7 is located in the casing 9 and located between the bearing 14 and the second fixing plate 8. The four magnetic rollers 6 are driven and connected through the gear 7. As shown in FIG. 3, the four magnetic rollers 6 on the gear 7 mesh with each other two by two. The first fixing plate 3 is connected with the first covering plate 2. The first covering plate 2 is connected with the output shaft of the lifting cylinder 12. The lifting cylinder 12 is installed on the outer wall of the cylindrical housing 4. The lifting cylinder 12 can drive the first covering plate 2 to move up and down so as to open or close the upper end of the cylindrical housing 4. The motor 1 is mounted to the upper end of the first covering plate 2. The motor 1 is connected with the outer layer 23 of one of the magnetic rollers 6. As it can be understood by those skilled in the art, when the lifting cylinder 12 drives the first covering plate 2 to descend to close the upper end of the cylindrical housing 4, the output shaft of the motor 1 is connected with the outer layer 23. When the lifting cylinder 12 drives the first covering plate 2 to ascend to open the upper end of the cylindrical housing 4, the output shaft of the motor 1 is disconnected from the outer layer 23. According to the aforesaid, when the motor 1 is working, it drives the outer layer 23 of one magnetic roller 6 to rotate. Since the four magnetic rollers 6 are driven and connected through the gear, the outer layers 23 of the other three magnetic rollers are also rotated. The rotating direction of the magnetic rollers 6 is shown as the arrow in FIG. 3. It should be noted that the outer layer 23 of the magnetic roller 6 is rotated but the inner core 13 is not rotated.

The outer layer 23 of the magnetic roller 6 may be made of a stainless steel material and the inner core 13 is made of a magnetic material so that when the liquid passes through the inside of the cylindrical housing 4, the iron filings or the like in the liquid will be adsorbed on the surface of the outer layer 23. As shown in FIG. 3, the fully automatic magnetic filter further comprises four scrapers 16 respectively corresponding to the outer layers 23 of the four magnetic rollers 6. The scrapers 16 are located in the cylindrical housing 4 and have a length about equal to that of the cylindrical housing 4. In this way, when the outer layers 23 of the magnetic rollers 6 located in the cylindrical housing 4 are rotated, the scrapers 16 can scrape off the iron filings adsorbed by the outer layers 23. Since the iron fittings are affected by the inner core 13, it is not easy for the scrapers 16 to scrape off the iron filings adsorbed by the outer layers 23. Therefore, in the present invention, the inner core 13 has a magnetic region 18 and a non-magnetic region 17. Referring to FIG. 3, the cross section of the inner core 13 is circular, and the non-magnetic region 17 is in the form of a sector. The angle of the sector is preferably 60°. The other part other than the sector is the magnetic region 18. Wherein, the non-magnetic region 17 corresponds to the scraper 16. When the iron filings adsorbed on the outer layer 23 are rotated to the non-magnetic region 17, the adsorbing force of the inner core 13 to the iron filings disappears so that the iron filings can be scraped off by the scraper 16.

The fully automatic magnetic filter further comprises a first drain tube 10 and a second drain tube 11. The second covering plate 5 has a drain outlet 20 and two sewage outlets 21. One end of the first drain tube 10 is connected to the drain outlet 20, and the other end of the first drain tube 10 extends to the outside of the casing 9. One end of the second drain tube 11 is connected to the two sewage outlets 21, and the other end of the second drain tube 11 extends to the outside of the casing 9. The second drain tube 11 is provided with a drain valve 22. A liquid inlet 19 and a liquid outlet 24 are provided on the outer wall of the cylindrical housing 4.

The working principle of the present invention is as follows:

When the motor is started, the outer layers of the four magnetic rollers are rotated. At this time, through the liquid inlet on the outer wall of the cylindrical housing, the liquid is injected into the cylindrical housing. After the liquid passes through the first two magnetic rollers, the outer layers of the magnetic rollers will absorb the iron filings. When the iron filings are rotated to the non-magnetic regions, the iron filings will be scraped off by the scrapers 16. The iron filings that have not been adsorbed by the first two magnetic rollers are adsorbed by the latter two magnetic rollers, and then the iron filings are scraped and removed by the corresponding scrapers. The scraped iron filings are sent to the sewage outlets to be drained. The clean liquid is output via the liquid outlet on the outer wall of the cylindrical housing.

The aforementioned motor and the drain valve can be controlled by a PLC (Programmable Logic Controller). Therefore, the rotational speed of the motor and the opening and closing time of the drain valve can be adjusted according to the iron filings content of the material. The iron filings can be cleaned without shutting down the magnetic filter, and the work efficiency can be effectively improved.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A fully automatic magnetic filter, comprising:
   a cylindrical housing;
   at least one magnetic roller, the magnetic roller being located in the cylindrical housing, the magnetic roller comprising an outer layer and an inner core, the outer layer being sleeved onto the inner core, wherein the inner core has a magnetic region and a nonmagnetic region;
   at least one scraper, the scraper being located in the cylindrical housing, the scraper cooperating with the outer layer of the magnetic roller and corresponding to the inner core;
   a motor and a lifting cylinder, the motor being detachably connected with the outer layer via the lifting cylinder, wherein when connected with the outer layer, the motor drives the outer layer of the magnetic roller to rotate, wherein when disconnected with the outer layer, the outer layer of the magnetic roller is not rotated;
   wherein the number of the at least one magnetic roller is four and corresponds to the number of the at least one scraper, each scraper corresponds to the outer layer of a corresponding one of the magnetic rollers, the outer layers of the magnetic rollers are driven and connected through a gear, and the motor is connected with the outer layer of one of the magnetic rollers.

2. The fully automatic magnetic filter as claimed in claim 1, wherein the non-magnetic region extends from one end to another end of the inner core in a longitudinal direction, and the non-magnetic region is in the form of a sector.

3. The fully automatic magnetic filter as claimed in claim 2, further comprising a first fixing plate, a second covering plate and a second fixing plate, the first fixing plate and the second covering plate being connected to two ends of the cylindrical housing respectively, the inner core extending to an outside of the second covering plate and being connected to the second fixing plate, the second fixing plate being mounted on the second covering plate, one end of the outer layer being connected to the first fixing plate, another end of the outer layer extending into the outside of the second covering plate and is connected to the gear, the gear being located between the second covering plate and the second fixing plate, the first covering plate being connected with the first fixing plate, the motor being mounted to the first covering plate, an output shaft of the motor being connected to the outer layer of the corresponding magnetic roller.

4. The fully automatic magnetic filter as claimed in claim 3, further comprising a bearing and a bearing seat, the bearing and the bearing seat being located at the outside of the second covering plate, the bearing being fitted onto the outer layer and located between the second covering plate and the gear, the bearing seat being fitted onto the bearing and mounted on the second covering plate.

5. The fully automatic magnetic filter as claimed in claim 4, further comprising a casing, the casing being mounted on the second covering plate, the casing and the cylindrical housing being located at two ends of the second covering plate respectively, the gear, the second fixing plate, the bearing and the bearing seat being located in the casing.

6. The fully automatic magnetic filter as claimed in claim 5, wherein an outer wall of the cylindrical housing is provided with a liquid inlet and a liquid outlet, the second covering plate has a drain outlet and a sewage outlet, the drain outlet is connected with one end of a first drain tube, an opposing end of the first drain tube extends to an outside of the casing, the sewage outlet is connected with one end of a second drain tube, and an opposing end of the second drain tube extends to the outside of the casing.

7. The fully automatic magnetic filter as claimed in claim 6, wherein the second drain tube is provided with a drain valve.

8. The fully automatic magnetic filter as claimed in claim 3, wherein the first fixing plate is made of polytetrafluoroethylene.

9. The fully automatic magnetic filter as claimed in claim 3, wherein the lifting cylinder being installed on an outer wall of the cylindrical housing, and an output shaft of the lifting cylinder being connected to the first covering plate.

* * * * *